(12) United States Patent
Lin (10) Patent No.: US 10,480,830 B2
(45) Date of Patent: Nov. 19, 2019

(54) SUPPORT FOR SOLAR PANELS (71) Applicant: HS RENEWABLE ENERGY LTD., Kaohsiung (TW)

(72) Inventor: Hung-Chun Lin, Kaohsiung (TW)

(73) Assignee: HS RENEWABLE ENERGY LTD., Kaohsiung (TW)

( * ) Notice: Subject to any disclaimer, the term of this patent is extended or adjusted under 35 U.S.C. 154(b) by 60 days.

(21) Appl. No.: 15/835,724

(22) Filed: Dec. 8, 2017

(65) Prior Publication Data
US 2019/0032963 A1 Jan. 31, 2019

(30) Foreign Application Priority Data

Jul. 25, 2017 (TW) .............................. 106210951 U (51) Int. Cl.
| | |
|---|---|
| *F24S 25/00* | (2018.01) |
| *H02S 20/30* | (2014.01) |
| *H02S 30/10* | (2014.01) |
| *H02S 20/23* | (2014.01) |
| *H02S 20/20* | (2014.01) |
| *F24S 25/632* | (2018.01) |

(Continued)

(52) U.S. Cl.
CPC ............... *F24S 25/00* (2018.05); *F24S 25/12* (2018.05); *F24S 25/632* (2018.05); *F24S 25/65* (2018.05); *H02S 20/20* (2014.12); *H02S 20/23* (2014.12); *H02S 20/30* (2014.12); *H02S 30/10* (2014.12); *F24S 2025/014* (2018.05); *F24S 2025/6003* (2018.05); *F24S 2025/802* (2018.05)

(58) Field of Classification Search
CPC ...... F24S 25/00; F24S 2025/041; F24S 25/70; F24S 30/425; F24S 25/10; F24S 25/11; F24S 25/12; F24S 25/13; F24S 25/15; F24S 25/16; F24S 2025/6003; F24S 2025/014; H02S 20/30; H02S 20/32; H02S 20/00; H02S 20/10; H02S 20/20; H02S 20/22; H02S 20/23; Y02E 10/47
See application file for complete search history.

(56) References Cited

U.S. PATENT DOCUMENTS

| | | | | |
|---|---|---|---|---|
| 4,919,379 A | * | 4/1990 | Goetz | .................... A45B 11/00 24/521 |
| 6,390,427 B1 | * | 5/2002 | McConnell | ............ B60N 3/103 248/228.3 |

(Continued)

*Primary Examiner* — Christopher Garft
(74) *Attorney, Agent, or Firm* — Muncy, Geissler, Olds & Lowe, P.C.

(57) ABSTRACT

A support for solar panels disclosed in the present invention comprises: a first bracket and a second bracket. The first bracket has a first frame for supporting a solar panel. The second bracket is arranged perpendicular to the first bracket and has a second frame connected to the first bracket. The first frame comprises a first clamping portion and a loading portion. The first bracket is clipped into the first clamping portion. The loading portion is provided for supporting the solar panel. The second frame comprises a second clamping portion and a third clamping portion. The first bracket is clipped into the second clamping portion. The second bracket is clipped into the third clamping portion. Since the two brackets arranged perpendicular to each other are respectively associated with a frame of particular function, the support can be efficiently and simply assembled.

6 Claims, 9 Drawing Sheets

(51) Int. Cl.
    *F24S 25/65*     (2018.01)
    *F24S 25/12*     (2018.01)
    *F24S 25/60*     (2018.01)

(56) References Cited

U.S. PATENT DOCUMENTS

| | | | | |
|---|---|---|---|---|
| 6,520,469 | B1* | 2/2003 | DiMauro | B60P 3/40 |
| | | | | 248/219.1 |
| 2002/0179789 | A1* | 12/2002 | Conner | G09F 7/18 |
| | | | | 248/219.3 |
| 2010/0089389 | A1* | 4/2010 | Seery | F16B 2/12 |
| | | | | 126/608 |
| 2011/0147554 | A1* | 6/2011 | Liao | F16B 2/12 |
| | | | | 248/226.11 |
| 2011/0278402 | A1* | 11/2011 | Birch | F16L 3/1016 |
| | | | | 248/74.4 |
| 2012/0073563 | A1* | 3/2012 | Zuritis | H02S 20/10 |
| | | | | 126/569 |
| 2014/0246549 | A1* | 9/2014 | West | H02S 20/30 |
| | | | | 248/220.22 |

\* cited by examiner

SUPPORT FOR SOLAR PANELS

FIELD OF THE INVENTION

The present invention is directed to a support, and more particularly, to a support for solar panels.

BACKGROUND OF THE INVENTION

As environmental consciousness increases in recent years, the study and utilization of renewable energy, e.g. sunlight, wind, or water, have been a prominent subject. Renewable energy is expected to replace part of traditional fossil energy in the near future. Among all kinds of renewable energy, sunlight is currently the major development target.

In sunlight utilization, solar panels are installed at a place with abundant sunshine for absorbing sunlight to generate direct current. Therefore, solar panels are often installed on a roof, a ceiling, or an open field. Generally, during the solar panel installation, C-type steel skeletons are installed at the place in light of the solar panel installation area and manner, and then the solar panels are directly locked on a top portion of the C-type steel skeletons.

However, each commercial type of solar panels usually has a particular size and a particular spacing between two adjacent locking holes. If the holes of C-type steel skeletons punched at a processing factory do not correspond with the spacing between two adjacent locking holes of the solar panels at the field, hole punching should be reprocessed. This not also easily leads to the destruction of a galvanized layer so as to quickly corrode the C-type steel skeletons, but also makes the field installation inconvenient.

Additionally, it is difficult to assemble the C-type steel skeletons, and the C-type steel skeletons have much limitation in the installation manner and the installation position.

Furthermore, the installation manner of C-type steel skeletons is too immovable to be altered at will. This results in difficulty in flexible extension thereof if necessary in future.

Briefly, the prior art fails to provide a support for solar panels which can be efficiently assembled, simply assembled, or assembled in "do it yourself" fashion. The prior art also fails to provide a support for solar panels which is suitable for solar panels of various sizes, installed conveniently, applied widely, and adapted at will. The prior art further fails to provide a support for solar panels whose frame is detached and reassembled easily, and installed at any place at will so as to movably support the entirety of the support.

SUMMARY OF THE INVENTION

An objective of the present invention is to provide a support for solar panels, and the support can be efficiently assembled.

Another objective of the present invention is to provide a support for solar panels, and the support can be assembled in "do it yourself" fashion.

A still another objective of the present invention is to provide a support for solar panels, and the support has two brackets arranged perpendicular to each other, and each bracket is associated with a frame of particular function to be efficiently and simply assembled.

A further objective of the present invention is to provide a support for solar panels, and the support has a frame to efficiently disperse the weight of carried solar panels to the support according to elementary geometric principles so as to keep the solar panel secure and safe.

An additional objective of the present invention is to provide a support for solar panels, and the support can be used for solar panels of various sizes, installed conveniently, applied widely, and adapted at will.

A yet another objective of the present invention is to provide a support for solar panels, and the support has a frame detached and reassembled easily, and installed at any place at will so as to movably support the entirety of the support.

For the foregoing and/or other objectives, the present invention discloses a support for carrying a solar panel, and the support comprises: a first bracket having a first frame for supporting the solar panel; and a second bracket arranged perpendicular to the first bracket and having a second frame connected to the first bracket; wherein the first frame comprises a first clamping portion and a loading portion, the first bracket is clipped into the first clamping portion, an end of the first clamping portion is an O-shaped tablet with a hollow opening, the first bracket penetrates through the O-shaped tablet to be clipped thereinto, another end of the first clamping portion is extended to form two first tablets, the loading portion is clipped between the two first tablets, and the loading portion is T-shaped for supporting the solar panel; wherein the second frame comprises a second clamping portion and a third clamping portion, the second clamping portion is formed with a first fixing member and a second fixing member, the first fixing member is a U-shaped tablet and has two second tablets extended from two sides thereof, the first bracket is clipped into the second clamping portion, the third clamping portion has a third fixing member, and the second bracket is clipped into the third clamping portion.

In an embodiment of the present invention, the second fixing member is formed with a first assembly, a second assembly, and a third assembly, the first assembly is a U-shaped tablet and has two third tablets extended from two sides thereof, the second assembly is a column, and the third assembly is connected to the first assembly by means of the second assembly.

In an embodiment of the present invention, the third fixing member is a tablet and detachably connected to the second fixing member by means of a screw, and the second bracket is clipped into the third clamping portion by means of the third assembly of the second fixing member and the third fixing member.

In an embodiment of the present invention, the second tablets of the first fixing member are detachably connected to the third tablets of the second fixing member by means of screws, a U-shaped section of the first fixing member is connected to a U-shaped section of the first assembly of the second fixing member mouth to mouth to form a hollow O-shaped structure so as to form the second clamping portion.

In an embodiment of the present invention, the first bracket is a solid cylindrical tube or a hollow cylindrical tube, and the second bracket is a solid rectangular tube or a hollow rectangular tube.

In an embodiment of the present invention, the second fixing member is formed with a first assembly, a second assembly, and a third assembly, the first assembly is a U-shaped tablet and has two third tablets extended from two sides thereof, the second assembly is a column, the third assembly is a U-shaped tablet and has two fourth tablets extended from two sides thereof, the third tablets are extended in a direction perpendicular to another direction in which the fourth tablets are extended, and the first assembly is connected to the third assembly by means of the second assembly.

In an embodiment of the present invention, the third fixing member is a U-shaped tablet and has two fifth tablets extended from two sides thereof, the fourth tablets are detachably connected to the fifth tablets by means of screws, and a U-shaped section of the third assembly is connected to a U-shaped section of the third fixing member mouth to mouth to from a hollow O-shaped structure so as to form the third clamping portion.

In an embodiment of the present invention, an opening direction of the O-shaped tablet of the first clamping portion is perpendicular to an opening direction of the O-shaped structure of the third clamping portion.

In an embodiment of the present invention, the first bracket is a solid cylindrical tube or a hollow cylindrical tube, and the second bracket is a solid cylindrical tube or a hollow cylindrical tube.

In an embodiment of the present invention, the third fixing member further comprises a locking portion, the locking portion has an inverted trapezoidal structure with an opening and comprises a ladder top and two ladder feet, an end of the locking portion at which the ladder top is positioned is closed and has a threaded hole, another end of the locking portion at which the ladder feet are positioned is open and wider than that at which the ladder top is positioned, the ladder feet are extended to form two sixth tablets, and the sixth tablets are detachably connected to the fourth tablets and the fifth tablets by means of screws.

In an embodiment of the present invention, the locking portion has two fixing plates connected to the ladder feet.

In an embodiment of the present invention, the support further comprises a carrying board locked to the locking portion by means of a screw.

DETAILED DESCRIPTION OF THE INVENTION

The detailed description and preferred embodiments of the invention will be set forth in the following content, and provided for people skilled in the art so as to understand the characteristics of the invention.

Figure 1:
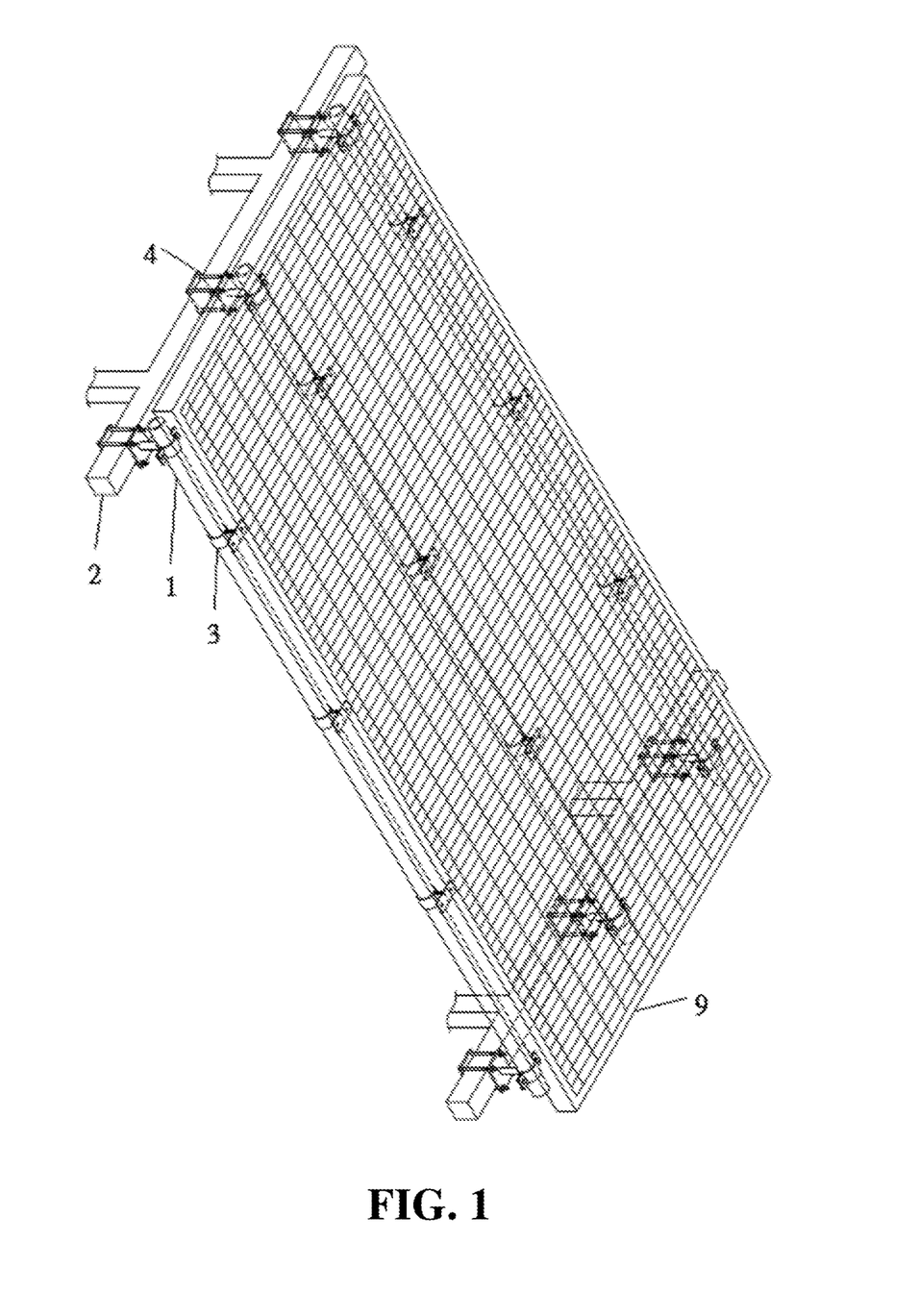
FIG. 1 is a schematic view showing a support for solar panels according to a first embodiment of the present invention.
Figure 2:
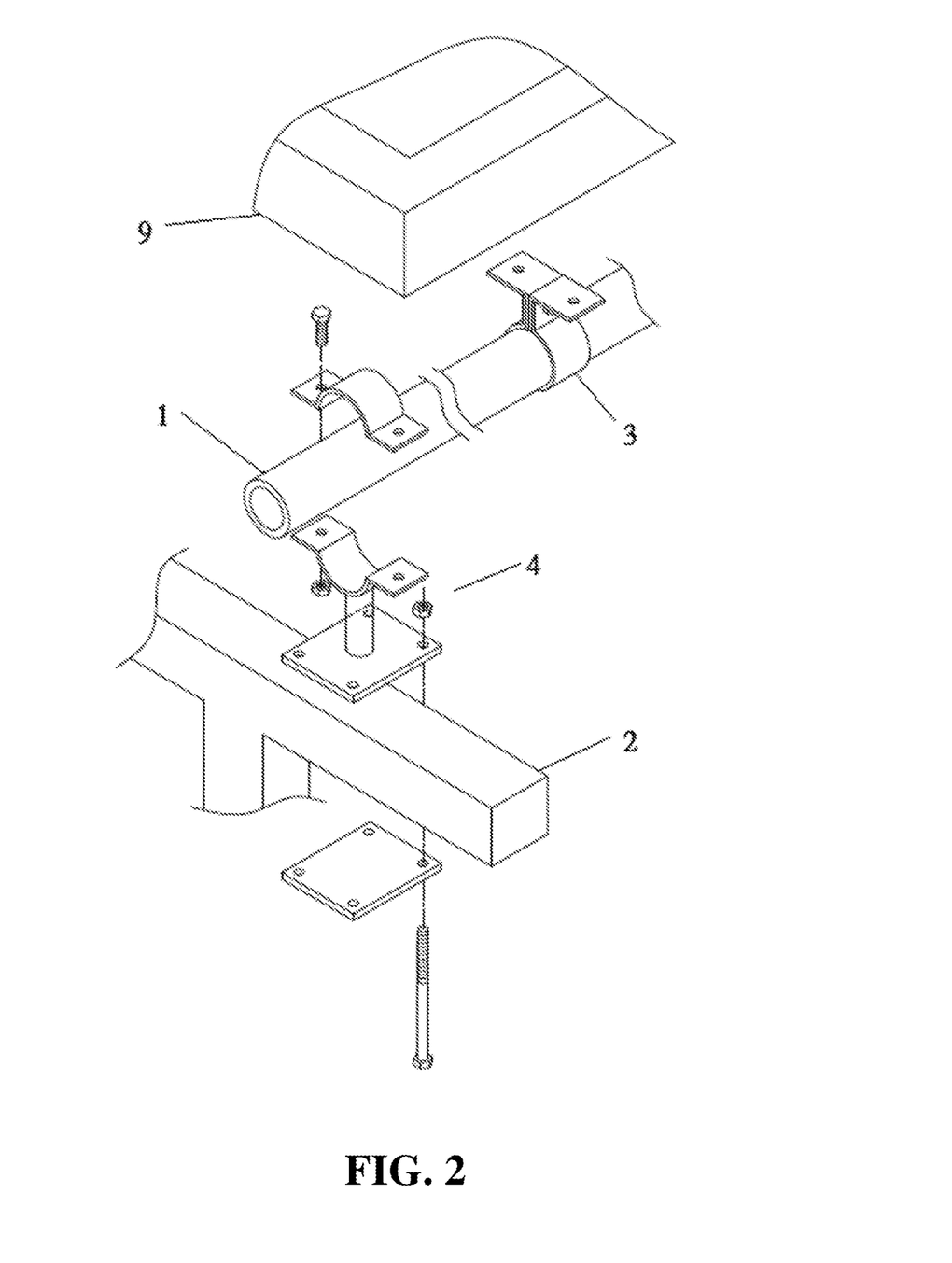
FIG. 2 is a partial enlarged view showing the support for solar panels according to the first embodiment.

FIG. 1 is a schematic view showing a support for solar panels according to a first embodiment of the present invention. FIG. 2 is a partial enlarged view showing the foregoing support for solar panels. As shown in FIGS. 1-2, the support for solar panels can carry a solar panel (9), and comprises a first bracket (1) and a second bracket (2). The first bracket (1) has a first frame (3) for supporting the solar panel (9). The second bracket (2) is arranged perpendicular to the first bracket (1), and has a second frame (4) connected to the first bracket (1). In another embodiment, the support for solar panels may comprise a number of first brackets (1) and a number of second brackets (2). Since the two brackets arranged perpendicular to each other are respectively associated with a frame of particular function, the support for solar panels according to the first embodiment can be efficiently and simply assembled.

Figure 3:
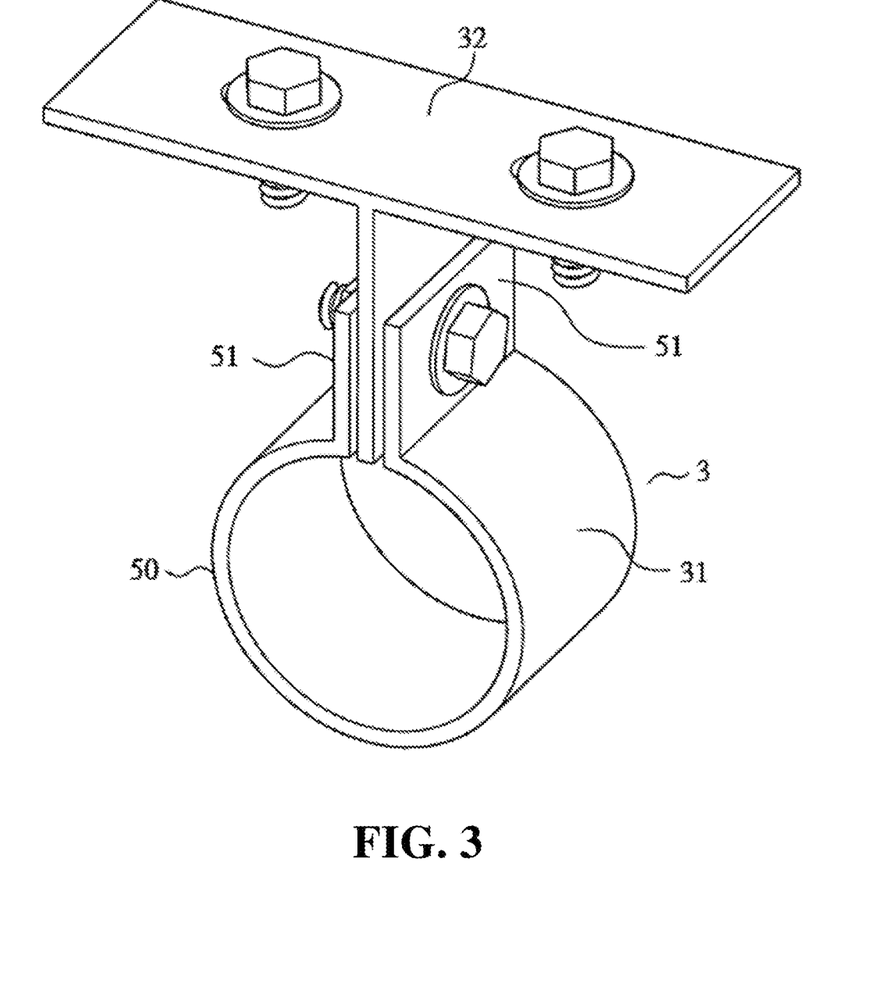
FIG. 3 is a schematic view showing a first frame of the support for solar panels according to the first embodiment.
Figure 4:
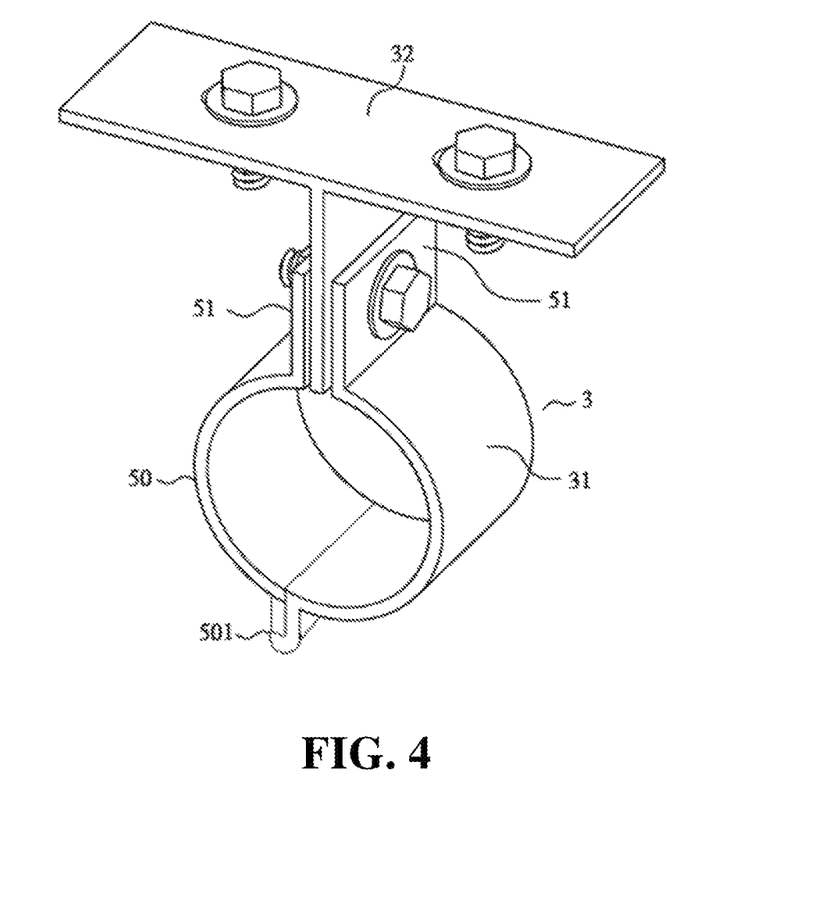
FIG. 4 is a schematic view showing a second frame of the support for solar panels according to the first embodiment.

FIG. 3 is a schematic view showing the first frame (3) of the support for solar panels according to the first embodiment. As shown in FIG. 3, the first frame (3) comprises a first clamping portion (31) and a loading portion (32). The first bracket (1) is clipped into the first clamping portion (31). An end of the first clamping portion (31) is an O-shaped tablet (50) with a hollow opening, and the first bracket (1) penetrates through the O-shaped tablet (50) to be clipped into the O-shaped tablet (50). Another end of the first clamping portion (31) is extended to form two first tablets (51), and the loading portion (32) is clipped between the two first tablets (51). The loading portion (32) is present in a T shape and can support the solar panel (9). The O-shaped tablet (50) is formed in an integral style or in a clip style. As shown in FIG. 4, when being in the clip style, the O-shaped tablet (50) is assembled by means of a rotatory shaft (501) so that a hollow O-shaped structure thereof is formed.

Figure 5:
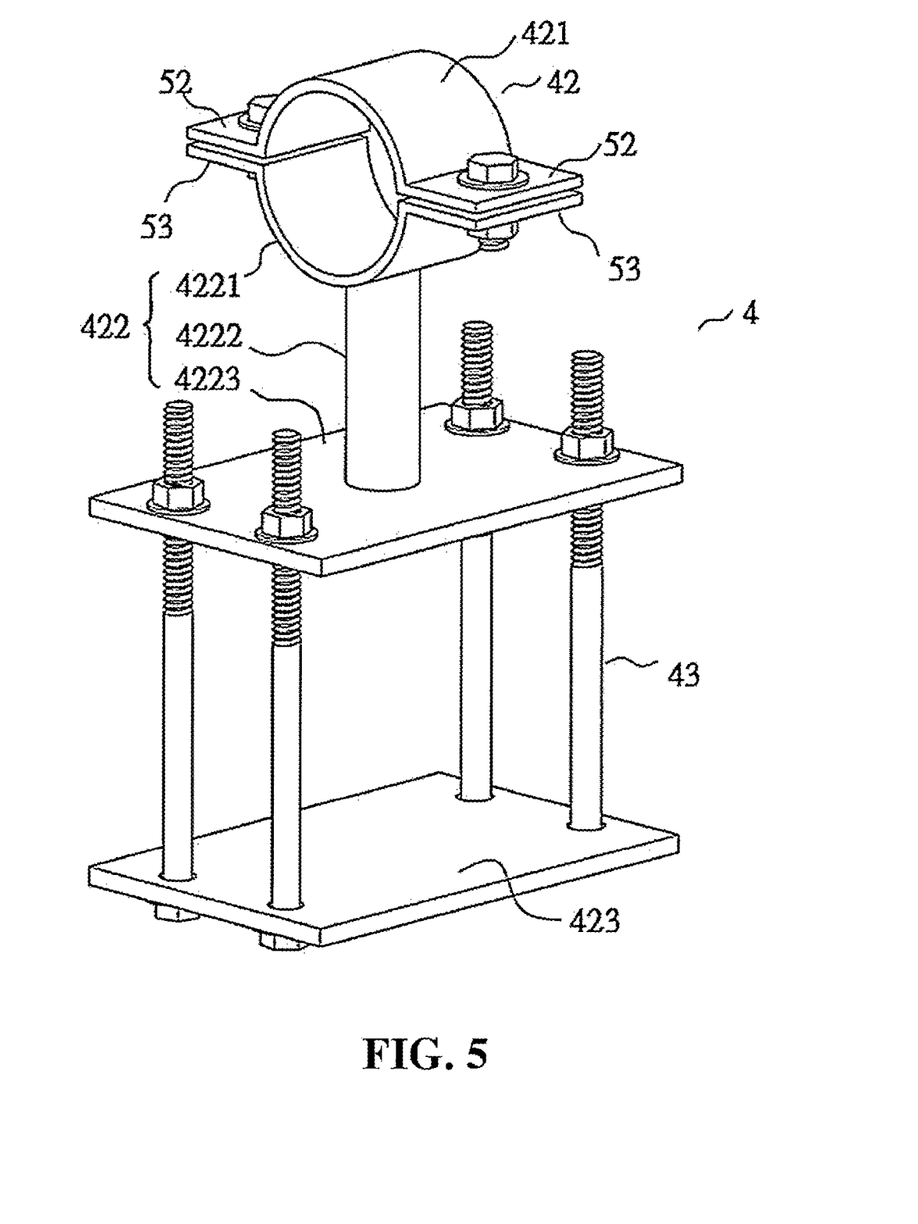
FIG. 5 is another schematic view showing the second frame of the support for solar panels according to the first embodiment.

FIG. 5 is a schematic view showing the second frame (4) of the support for solar panels according to the first embodiment. As shown in FIG. 5, the second frame (4) comprises a second clamping portion (42) and a third clamping portion (43). The second clamping portion (42) is formed with a first fixing member (421) and a second fixing member (422). The first fixing member (421) is a U-shaped tablet and has two second tablets (52) extended from two sides of the first fixing member (421). The first bracket (1) is clipped into the second clamping portion (42). The third clamping portion (43) has a third fixing member (423), and the second bracket (2) is clipped into the third clamping portion (43). As such, the support for solar panels according to the first embodiment can be efficiently and simply assembled or can be assembled in "do it yourself" fashion. In addition, the first fixing member (421) is connected to the second fixing member (422) by means of a screw or a clip.

The brackets of the support for solar panels in the first embodiment can efficiently disperse the weight of the carried solar panel to the support according to elementary geometric principles so as to keep the solar panel secure and safe. As shown in FIG. 5, in the first embodiment, the second fixing member (422) is formed with a first assembly (4221), a second assembly (4222), and a third assembly (4223). The first assembly (4221) is a U-shaped tablet and has two third tablets (53) extended from two sides of the first assembly (4221). The second assembly (4222) is a column. The third assembly (4223) is connected to the first assembly (4221) by means of the second assembly (4222).

As shown in FIG. 5, in the first embodiment, the third fixing member (423) is a tablet and detachably connected to the second fixing member (422) (the third assembly (4223)) by means of a screw. The second bracket (2) is clipped into the third clamping portion (43) by means of the third assembly (4223) of the second fixing member (422) and the third fixing member (423).

As shown in FIG. 5, in the first embodiment, the second tablets (52) of the first fixing member (421) are detachably connected to the third tablets (53) of the second fixing member (422) by means of screws. A U-shaped section of the first fixing member (421) is connected to a U-shaped section of the first assembly (4221) of the second fixing member (422) mouth to mouth to form a hollow O-shaped structure so as to form the second clamping portion (42) into which the first bracket (1) is clipped. As such, the frames of the support for solar panels in the first embodiment of can be detached and reassembled easily, and installed at any place at will so as to movably support the entirety of the support.

As shown in FIGS. 1-5, in the first embodiment, the first bracket (1) is a solid cylindrical tube or a hollow cylindrical tube, and the second bracket (2) is a solid rectangular tube or a hollow rectangular tube. Obviously, the support for solar panels in the first embodiment can carry solar panels of various sizes, be installed conveniently, be applied widely, and be adapted at will.

Figure 6:
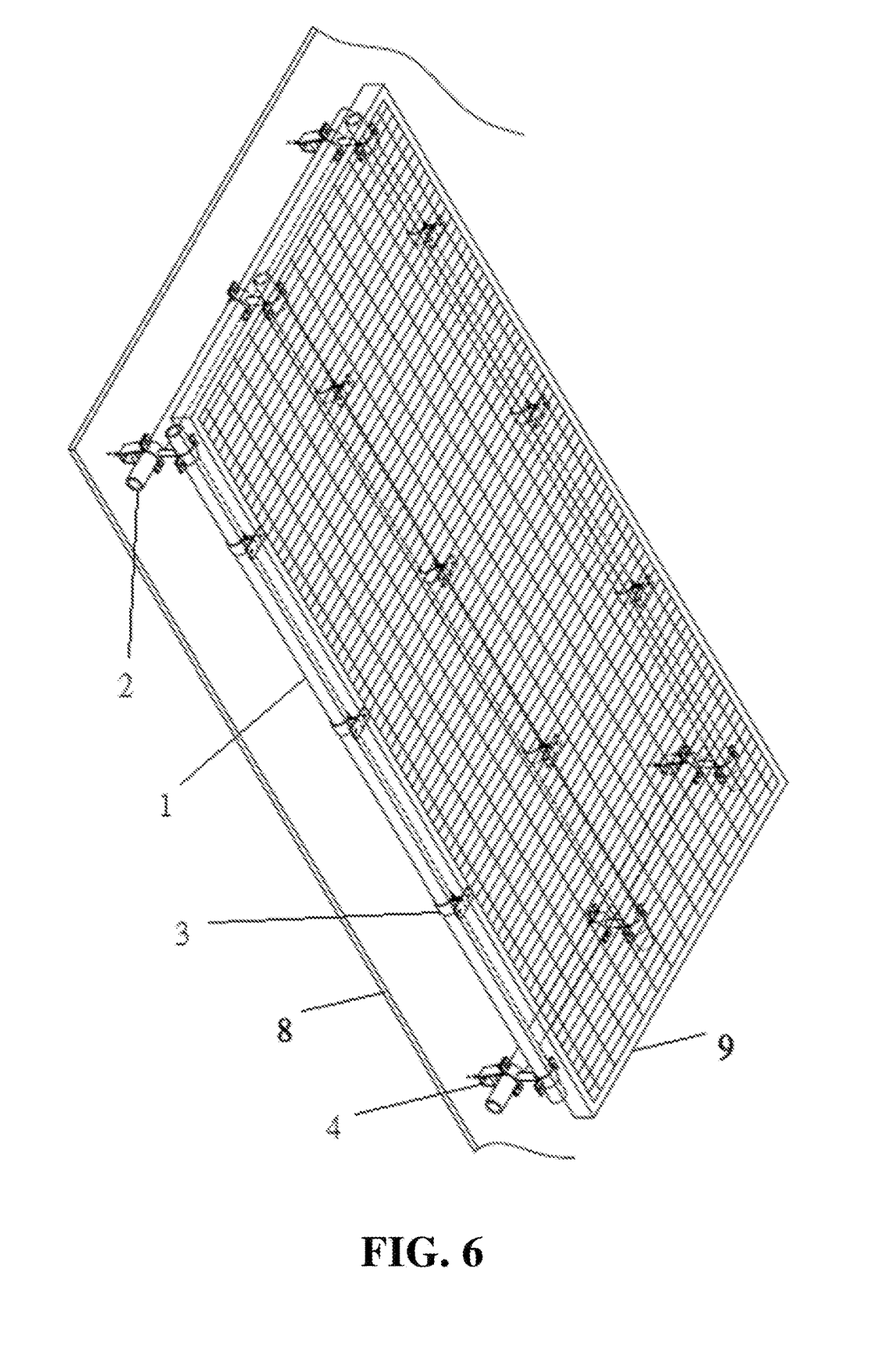
FIG. 6 is a schematic view showing a support for solar panels according to a second embodiment of the present invention.

FIG. 6 is a schematic view showing a support for solar panels according to a second embodiment of the present invention. The support for solar panels according to the second embodiment can carry a solar panel (9), and comprises a first bracket (1) and a second bracket (2). The first bracket (1) has a first frame (3) for supporting the solar panel (9). The second bracket (2) is arranged perpendicular to the first bracket (1), and has a second frame (4) connected to the first bracket (1). What is different between the first embodiment and the second embodiment is that the support for solar panels according to the second embodiment further comprises a carrying board (8) locked to the locking portion (6) by means of a screw. Therefore, the support for solar panels according to the second embodiment can be installed at positions of different environments.

Figure 7:
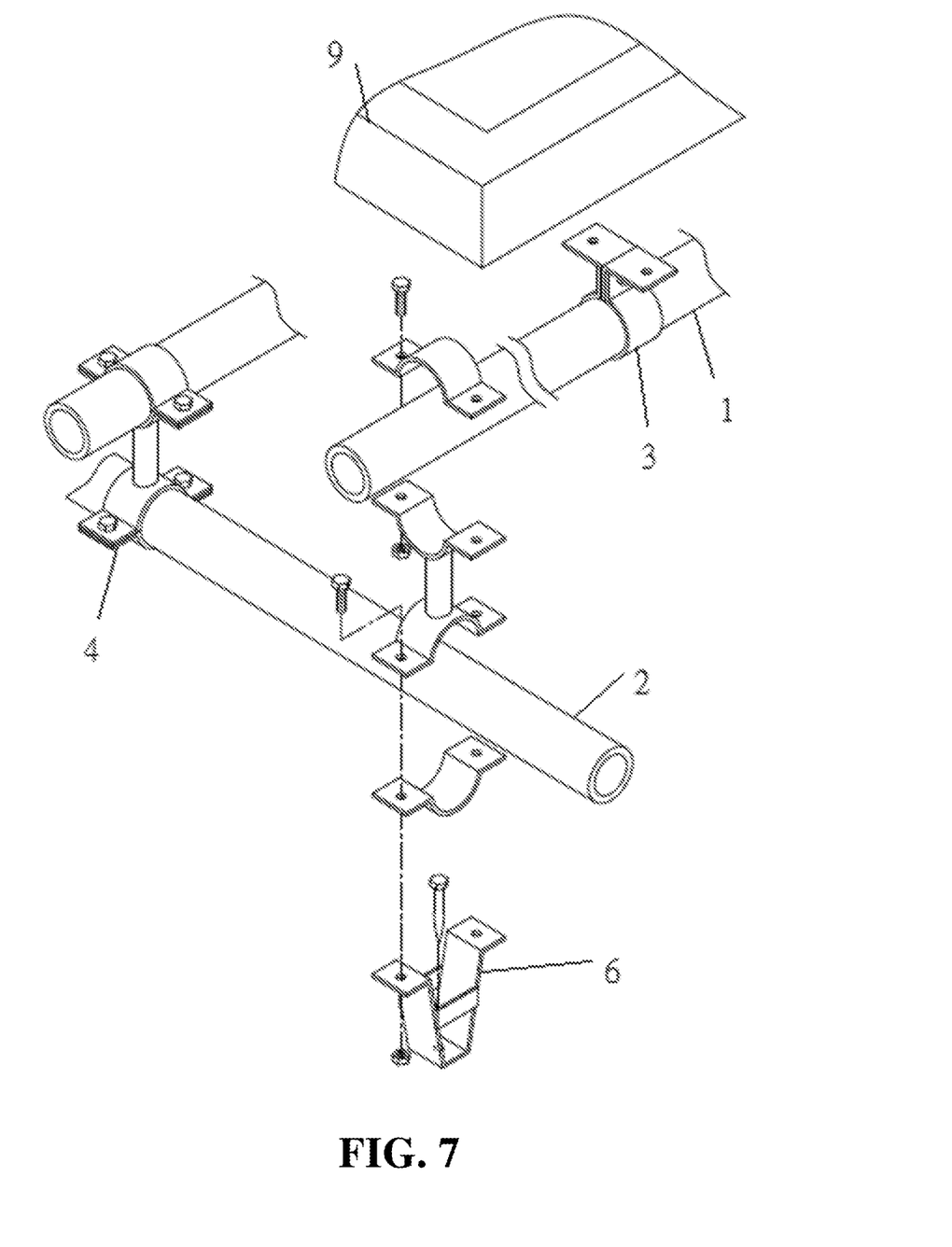
FIG. 7 is a partial enlarged view showing the support for solar panels according to the second embodiment.

FIG. 7 is a partial enlarged view showing the support for solar panels according to the second embodiment. As shown in FIGS. 6-7, the first bracket (3) of the support for solar panels according to the second embodiment is similar to that according to the first embodiment, and is not redundantly described herein.

Figure 8:
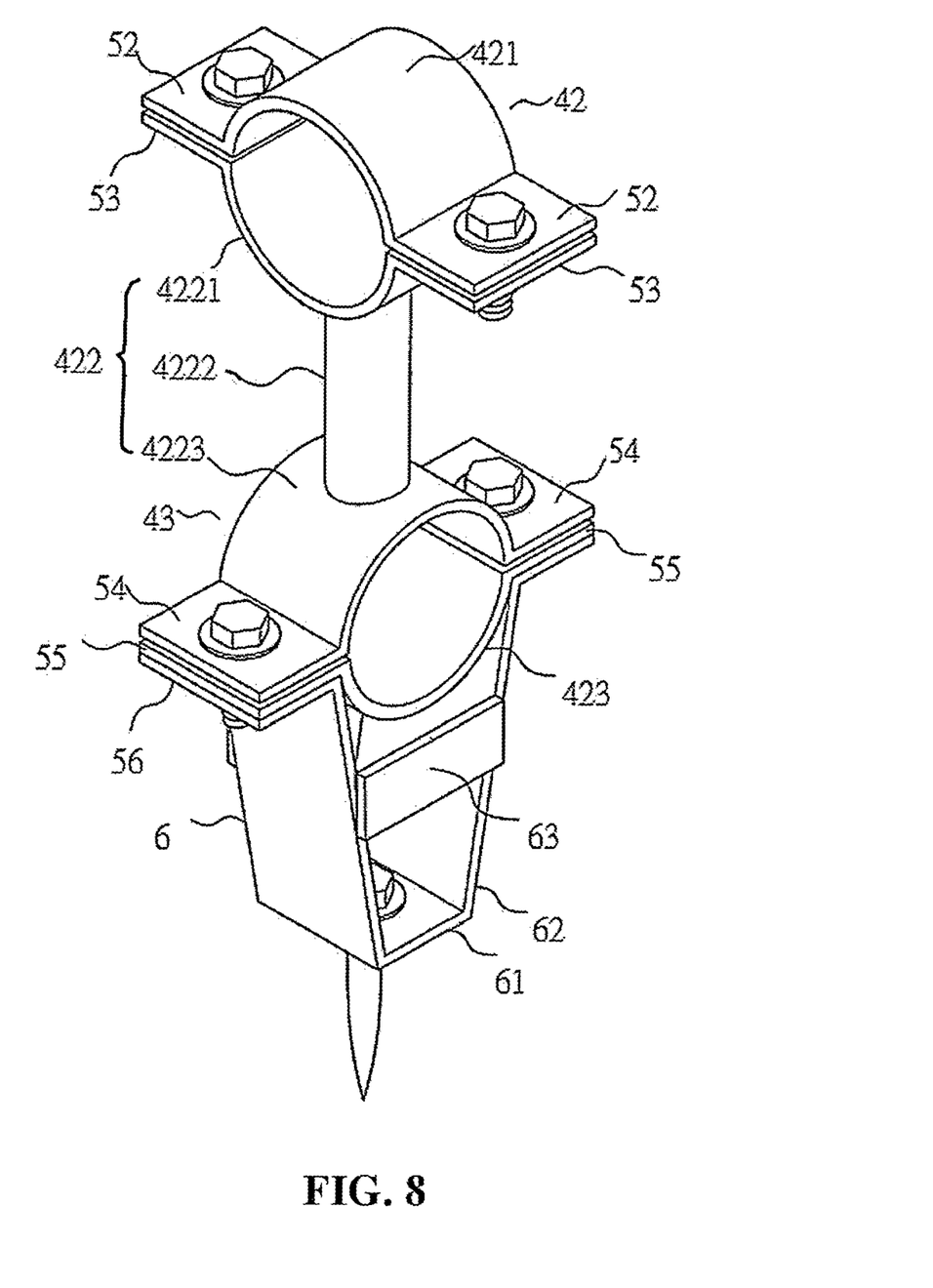
FIG. 8 is a schematic view showing a second frame of the support for solar panels according to the second embodiment.

FIG. 8 is a schematic view showing the second frame (4) of the support for solar panels according to the second embodiment. As shown in FIG. 8, the second frame (4) comprises a second clamping portion (42) and a third clamping portion (43). The first bracket (1) is clipped into the second clamping portion (42). The second bracket (2) is clipped into the third clamping portion (43).

The second clamping portion (42) is formed with a first fixing member (421) and a second fixing member (422). The first fixing member (421) is a U-shaped tablet and has two second tablets (52) extended from two sides of the first fixing member (421). The second fixing member (422) of the second frame (4) is formed with a first assembly (4221), a second assembly (4222), and a third assembly (4223). The first assembly (4221) is a U-shaped tablet and has two third tablets (53) extended from two sides of the first assembly (4221). The second assembly (4222) is a column.

A U-shaped section of the first fixing member (421) is connected to a U-shaped section of the first assembly (4221) of the second fixing member (422) mouth to mouth to form a hollow O-shaped structure so as to form the second clamping portion (42) into which the first bracket (1) is clipped.

The third clamping portion (43) has a third fixing member (423). As shown in FIG. 8, what is different between the first embodiment and the second embodiment is that the third assembly (4223) of the support for solar panels according to the second embodiment is a U-shaped tablet and has two fourth tablets (54) extended from two sides of the third assembly (4223). The third tablets (53) are extended in a direction perpendicular to another direction in which the fourth tablets (54) are extended. The first assembly (4221) is connected to the third assembly (4223) by means of the second assembly (4222).

As shown in FIG. 8, what is different between the first embodiment and the second embodiment is that the third fixing member (423) of the support for solar panels according to the second embodiment is a U-shaped tablet and has two fifth tablets (55) extended from two sides of the third assembly (423). The fourth tablets (54) are detachably connected to the fifth tablets (55) by means of screws. A U-shaped section of the third assembly (4223) is connected to a U-shaped section of the third fixing member (423) mouth to mouth to from a hollow O-shaped structure so as to form the third clamping portion (43) into which the second bracket (2) is clipped.

For efficiently dispersing the weight of the carried solar panel to the support to keep the solar panel secure and safe, an opening direction of the O-shaped structure of the second clamping portion (42) is perpendicular to an opening direction of the O-shaped structure of the third clamping portion (43). Under the geometric principle that the opening directions are perpendicular to each other, the shearing force of the carried solar panel can be thoroughly dispersed.

Figure 9:
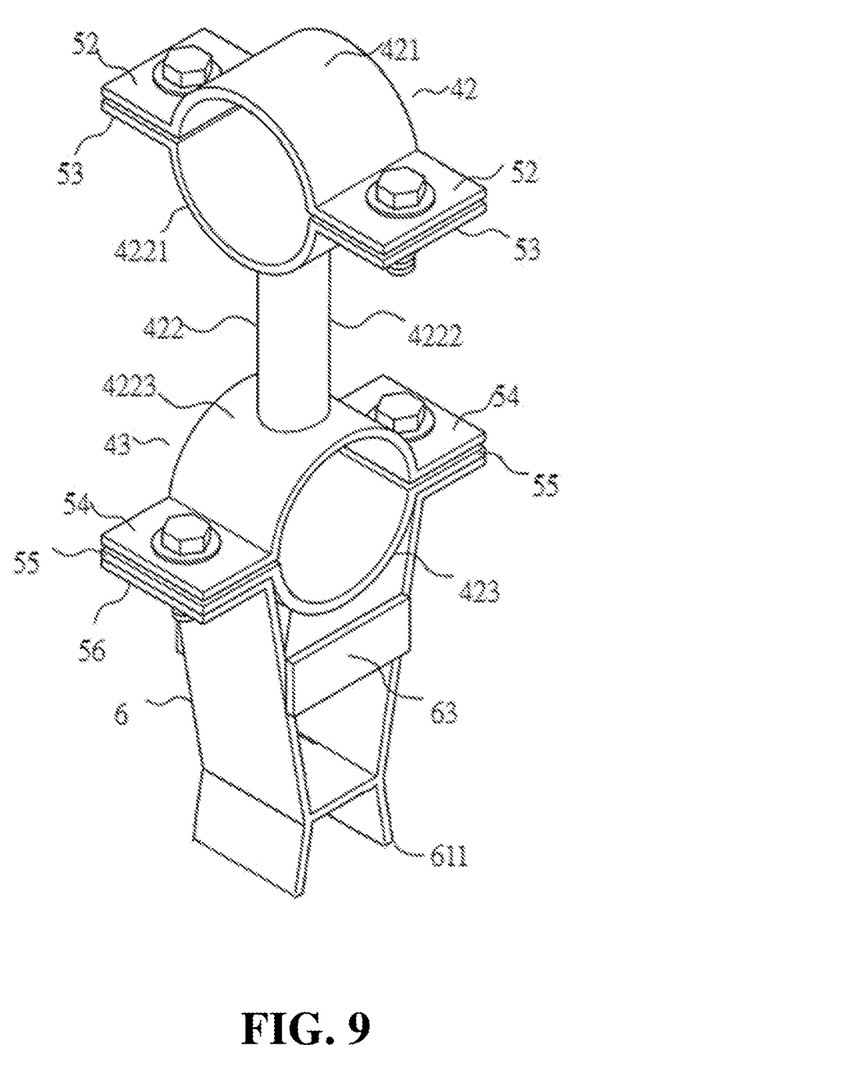
FIG. 9 is another schematic view showing the second frame of the support for solar panels according to the second embodiment.

As shown in FIG. 8, what is different between the first embodiment and the second embodiment is that the third fixing member (423) of the support for solar panels according to the second embodiment further comprises a locking portion (6). The locking portion (6) has an inverted trapezoidal structure with an opening and comprises a ladder top (61) and two ladder feet (62). An end of the locking portion (6) at which the ladder top (61) is positioned is closed and has a threaded hole; another end of the locking portion (6) at which the ladder feet (62) are positioned is open and wider than that at which the ladder top (61) is positioned, and the ladder feet (62) are extended to form two sixth tablets (56). The sixth tablets (56) are detachably connected to the fourth tablets (54) and the fifth tablets (55) by means of screws. The locking portion (6) has two fixing plates (63) respectively connected to the ladder feet (62). The two fixing plates (63) can strengthen the locking efficiency of the locking portion (6). As such, the frames of the support for solar panels according to the second embodiment are detached and reassembled easily, are installed at any place at will, and movably support the entirety of the support. When the support for solar panels according to the second embodiment is installed on the corrugated roofing sheet, two wings (611) are extended from the ladder top (61) of the locking portion (6). By which, the ladder top (61) with the two wings (611) can be attached to the spike of the corrugated roofing sheet so as to enhance the compactness between the support and the corrugated roofing sheet and improve ease of use. As shown in FIG. 9, if the carrying board (8) has a spike as that of the corrugated roofing sheet, the wing (611) also can strength the installation stability of the locking portion (6).

What is different between the first embodiment and the second embodiment is that the first bracket (1) of the support for solar panels according to the second embodiment is a solid cylindrical tube or a hollow cylindrical tube, and the second bracket (2) thereof is a solid cylindrical tube or a hollow cylindrical tube.

While the invention has been described in connection with what is considered the most practical and preferred embodiments, it is understood that this invention is not limited to the disclosed embodiments but is intended to cover various arrangements included within the spirit and scope of the broadest interpretation so as to encompass all such modifications and equivalent arrangements.

What is claimed is:

1. A support for carrying a solar panel, comprising:
a first bracket, having a first frame for supporting the solar panel; and
a second bracket, arranged perpendicular to the first bracket and having a second frame connected to the first bracket;
wherein the first frame comprises a first clamping portion and a loading portion, the first bracket is clipped into the first clamping portion, an end of the first clamping portion is an O-shaped tablet, the O-shaped tablet is formed in an integral style or in a clip style, the first bracket is clipped into the O-shaped tablet, another end of the first clamping portion is extended to form two first tablets, the loading portion is clipped between the two first tablets, and the loading portion is T-shaped for supporting the solar panel;
wherein the second frame comprises a second clamping portion and a third clamping portion, the second clamping portion is formed with a first fixing member and a second fixing member, the first fixing member is a U-shaped tablet and has two second tablets extended from two sides thereof, the second fixing member is formed with a first assembly, a second assembly, and a third assembly, the first assembly is a U-shaped tablet and has two third tablets extended from two sides thereof, the second assembly is a column, the third assembly is a U-shaped tablet and has two fourth tablets extended from two sides thereof, the third tablets are extended in a direction perpendicular to another direction in which the fourth tablets are extended, the third assembly is connected to the first assembly by means of the second assembly, the first fixing member is connected to the second fixing member by means of a screw the first bracket is clipped into the second clamping portion, the third clamping portion has a third fixing member, the third fixing member is detachably connected to the second fixing member by means of a screw, and the second bracket is clipped into the third clamping portion by means of the second fixing member and the third fixing member,
wherein the third fixing member is a U-shaped tablet and has two fifth tablets extended from two sides thereof, the fourth tablets are detachably connected to the fifth tablets by means of screws, and a U-shaped section of the third assembly is connected to a U-shaped section of the third fixing member mouth to mouth to from a hollow O-shaped structure so as to form the third clamping portion into which the second bracket is clipped,
wherein the third fixing member further comprises a locking portion, the locking portion has an inverted trapezoidal structure with an opening and comprises a ladder top and two ladder feet, an end of the locking portion at which the ladder top is positioned is closed and has a threaded hole, another end of the locking portion at which the ladder feet are positioned is open and wider than that at which the ladder top is positioned, the ladder feet are extended to faun two sixth tablets, and the sixth tablets are detachably connected to the fourth tablets and the fifth tablets by means of screws.

2. The support as claimed in claim 1, wherein the second tablets of the first fixing member are detachably connected to the third tablets of the second fixing member by means of screws, a U-shaped section of the first fixing member is connected to a U-shaped section of the first assembly of the second fixing member mouth to mouth to form a hollow O-shaped structure so as to form the second clamping portion into which the first bracket is clipped.

3. The support as claimed in claim 1, wherein an opening direction of the O-shaped tablet of the first clamping portion is perpendicular to an opening direction of the O-shaped structure of the third clamping portion.

4. The support as claimed in claim 1, wherein the ladder top is extended to form two wings.

5. The support as claimed in claim 1, wherein the locking portion has two fixing plates respectively connected to the ladder feet.

6. The support as claimed in claim 4, further comprising:
a carrying board locked to the locking portion by means of a screw.

* * * * *